(12) United States Patent
Tsukagoshi

(10) Patent No.: US 11,470,296 B2
(45) Date of Patent: *Oct. 11, 2022

(54) TRANSMITTER, TRANSMISSION METHOD, RECEIVER, AND RECEPTION METHOD

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,885

(22) Filed: Mar. 1, 2021

(65) Prior Publication Data

US 2021/0185290 A1    Jun. 17, 2021

Related U.S. Application Data

(63) Continuation of application No. 16/076,589, filed as application No. PCT/JP2017/045474 on Dec. 19, 2017, now Pat. No. 10,965,927.

(30) Foreign Application Priority Data

Dec. 27, 2016   (JP) .............................. JP2016-253318

(51) Int. Cl.
*H04N 9/87*     (2006.01)
*H04H 60/13*    (2008.01)
(Continued)

(52) U.S. Cl.
CPC .......... *H04N 9/8715* (2013.01); *H04H 20/28* (2013.01); *H04H 60/07* (2013.01); *H04H 60/13* (2013.01);
(Continued)

(58) Field of Classification Search
CPC ........... H04N 21/23605; H04N 21/438; H04N 21/242; H04N 21/4884; H04N 5/278;
(Continued)

(56) References Cited

U.S. PATENT DOCUMENTS

| 10,965,927 B2 * | 3/2021 | Tsukagoshi .......... H04N 21/438 |
| 2006/0098936 A1 | 5/2006 | Ikeda |
| 2010/0086285 A1 | 4/2010 | Sasaki |

FOREIGN PATENT DOCUMENTS

| CN | 103988520 A | 8/2014 |
| JP | 2007-282163 A | 10/2007 |

(Continued)

OTHER PUBLICATIONS

International Search Report dated Feb. 6, 2018, in PCT/JP2017/045474 filed Dec. 19, 2017.
(Continued)

*Primary Examiner* — Guerrier Merant
(74) *Attorney, Agent, or Firm* — Oblon, McClelland, Maier & Neustadt, L.L.P.

(57) ABSTRACT

An association with a system timing at the time of transmission is secured without changing a display timing in text information of a subtitle, and a reception side displays the subtitle at an appropriate timing.
A packet in which a document of the text information of the subtitle having display timing information is included in a payload is generated and transmitted in synchronization with a sample period. A header of the packet includes a time stamp on a first time axis indicating a start time of the corresponding sample period. The payload of the packet further includes reference time information of a second time axis regarding the display timing associated with the start time of the corresponding sample period.

18 Claims, 19 Drawing Sheets

(51) Int. Cl.
  *H04N 21/236* (2011.01)
  *H04H 20/28* (2008.01)
  *H04N 21/242* (2011.01)
  *H04H 60/07* (2008.01)
  *H04N 21/43* (2011.01)
  *H04N 5/278* (2006.01)
  *H04N 21/438* (2011.01)
  *H04N 21/488* (2011.01)
  *G11B 27/10* (2006.01)

(52) U.S. Cl.
  CPC ....... *H04N 5/278* (2013.01); *H04N 21/23605* (2013.01); *H04N 21/23614* (2013.01); *H04N 21/242* (2013.01); *H04N 21/438* (2013.01); *H04N 21/43074* (2020.08); *H04N 21/4884* (2013.01); *G11B 27/10* (2013.01)

(58) Field of Classification Search
  CPC .............. H04N 9/8715; H04N 21/4307; H04N 21/4348; H04N 21/23614; H04N 21/434; H04H 60/13; H04H 20/28; H04H 60/07; G11B 27/10
  See application file for complete search history.

(56) References Cited

FOREIGN PATENT DOCUMENTS

| JP | 2012-169885 A | 9/2012 |
| JP | 2015-159363 A | 9/2015 |
| WO | WO 2016/159636 a1 | 10/2016 |
| WO | WO 2016/167187 A1 | 10/2016 |

OTHER PUBLICATIONS

Extended European Search Report dated Jan. 7, 2019 in the corresponding European Application No. 17887906.0 8 pages.

\* cited by examiner

FIG. 3

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 4

TTML Metadata (a)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

TTML Styling (b)
```
<styling xmlns:tts="http://www.w3.org/ns/ttml#styling">
    <!-- s1 specifies default color, font, and text alignment -->
    <style xml:id="s1"
          tts:color="white"
          tts:fontFamily="proportionalSansSerif"
          tts:fontSize="22px"
          tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

TTML Layout (c)
```
<layout xmlns:tts="http://www.w3.org/ns/ttml#styling">
    <region xml:id="subtitleArea"
          style="s1"
          tts:extent="560px 62px"
          tts:padding="5px 3px"
          tts:backgroundColor="black"
          tts:displayAlign="after"
    />
</layout>
```

FIG. 5

TTML Body

```
<body region="subtitleArea">
    <div>
        <p xml:id="subtitle1" begin="3s" end="6s">
        I'm going to the station now.
        </p>
    </div>
</body>
```

| Syntax | Size | Type |
|---|---|---|
| PES_packet() { | | |
| PES_startcode_prefix | 24 | bslbf |
| stream_id | 8 | bslbf |
| PES_packet_length | 16 | uimsbf |
| Optional_PES_header() | | |
| PES_packet_data_byte | 8 | |
| } | | |

(b)

| Syntax | Size | Type |
|---|---|---|
| PES_data_byte_field() { | | |
| data_identifier | 8 | bslbf |
| subtitle_stream_id | 8 | bslbf |
| while nextbits() == '0000 1111' { | | |
| TimedTextSubtitling_segments() | | |
| } | | |
| end_of_PES_data_field_marker | 8 | "0xff" |
| } | | |

PES_startcode_prefix   0x000001
Stream_id   1011 1101   private stream1

FIG. 16

| TT_subtitle segment_type | DESCRIPTION OF KINDS |
|---|---|
| 0xA0 | TTML_segment |
| 0xA1 | Reftime_segment |
| others | Reserved for future use |

| Syntax | Size | Type |
|---|---|---|
| TTML_segment() { | | |
| sync_byte | 8 | bslbf |
| segment_type | 8 | bslbf |
| segment_length | 16 | uimsbf |
| TTML_version_number | 4 | uimsbf |
| reserved | 4 | bslbf |
| segment_associate_id | 8 | uimsbf |
| segment_payload() | | |
| } | | |

(b)

segment_associate_id (8bits)
USED TO IDENTIFY MUTUALLY ASSOCIATED SEGMENTS

| Syntax | Size | Type |
|---|---|---|
| Reftime_segment(){ | | |
| sync_byte | 8 | bslbf |
| segment_type | 8 | bslbf |
| segment_length | 16 | uimsbf |
| reftime_version_number | 4 | uimsbf |
| reserved | 4 | bslbf |
| number_of_reftime_targets | 8 | uimsbf |
| for ( j = 0 ; j < number_of_reftime_targets ; j++ ) { | | |
| segment_associate_id | 8 | uimsbf |
| reftime_hour | 8 | tcimsbf |
| reftime_minute | 8 | tcimsbf |
| reftime_second | 8 | tcimsbf |
| reftime_frame | 8 | tcimsbf |
| } | | |
| } | | |

(b)

number_of_reftime_targets (8bits)  THE NUMBER OF TARGETS TO WHICH reftime IS SUPPLIED
segment_associate_id (8bits)  USED TO IDENTIFY MUTUALLY ASSOCIATED SEGMENTS
reftime_hour (8bits)  1 0 HOUR DESCRIBED IN DECIMAL
reftime_minute (8bits)  1 0 MINUTE DESCRIBED IN DECIMAL
reftime_second (8bits)  1 0 SECOND DESCRIBED IN DECIMAL
reftime_frame (8bits)  1 0 FRAME DESCRIBED IN DECIMAL

TRANSMITTER, TRANSMISSION METHOD, RECEIVER, AND RECEPTION METHOD

CROSS REFERENCE TO RELATED APPLICATIONS

This is a continuation application of U.S. application Ser. No. 16/076,589, filed Aug. 8, 2018, which is a National Stage of International Application No. PCT/JP2017/045474, filed Dec. 19, 2017, which claims the benefit Japanese Application No. 2016-253318, filed Dec. 27, 2016, the entire contents of each of which are hereby incorporated herein by reference in their entirety.

TECHNICAL FIELD

The present technology relates to a transmitter, a transmission method, a receiver, and a reception method, and more particularly, to a transmitter and the like for transmitting a document of text information of a subtitle having display timing information.

BACKGROUND ART

Conventionally, for example, in broadcasting with Digital Video Broadcasting (DVB) and the like, and an operation for transmitting information of a subtitle as bit map data is performed. Recently, it has been suggested to transmit subtitle information in a text character code, that is, in a text-based way. In this case, a font is expanded according to a resolution by a reception side.

Furthermore, in a case where the subtitle information is transmitted in a text-based way, it has been proposed that the text information includes timing information. As the text information, for example, the World Wide Web Consortium (W3C) proposes the Timed Text Markup Language (TTML) (refer to Patent Document 1).

CITATION LIST

Patent Document

Patent Document 1: Japanese Patent Application Laid-Open No. 2012-169885

SUMMARY OF THE INVENTION

Problems to be Solved by the Invention

It is considered that a packet including a document of the TTML is generated and transmitted in synchronization with a sample period (fixed section). In this case, a header of the packet includes a time stump indicating a start time of the corresponding sample period. Regarding the time stamps, timings are uniformly managed in a whole system.

A display timing (begin, end) of a domain of the TTML is only a relative timing of each TTML package, and the display timing does not synchronize with a system. On the other hand, a subtitle of the TTML is produced for each content and is independent from timing management at the time of distribution. Therefore, a synchronization method is required that secures an association with a system timing at the time of transmission without changing the display timing (begin, end) which is a relative timing of the subtitle of the TTML.

An object of the present technology is to secure an association with a system timing at the time of transmission without changing a display timing in text information of a subtitle and display the subtitle at an appropriate timing by a reception side.

Solutions to Problems

A concept of the present technology is
a transmitter including
a packet transmission unit that generates and transmits a packet in which a document of text information of a subtitle having display timing information is included in a payload in synchronization with a sample period, in which
a time stamp on a first time axis indicating a start time of the corresponding sample period is included in a header of the packet, and
the payload of the packet further includes reference time information of a second time axis regarding the display timing, associated with the start time of the corresponding sample period.

In the present technology, the packet is generated and transmitted by the transmission unit in synchronization with the sample period. The payload of the packet includes the document of the text information of the subtitle having the display timing information. For example, the packet may be a PES packet. Furthermore, the text information of the subtitle may be described in the TTML or a format derived from the TTML.

The header of the packet includes the time stamp on the first time axis indicating the start time of the corresponding sample period. Furthermore, the payload of the packet further includes the reference time information of the second time axis regarding the display timing, associated with the start time of the corresponding sample period. For example, the reference time information may be time information indicating the start time of the corresponding sample period. Furthermore, for example, the reference time information may be time information indicating a difference between the display start time indicated by the display timing information and the start time of the corresponding sample period or a difference between the display end time indicated by the display timing information and the start time of the corresponding sample period. Furthermore, for example, a time may be indicated by a count value of 90 kHz on the first time axis, and a time may be indicated by an hour-minute-second frame on the second time axis.

Furthermore, for example, the payload of the packet may include a first segment having the document of the text information of the subtitle and a second segment having the reference time information regarding the display timing. Then, in this case, the first segment may be associated with the second segment corresponding to the first segment with identification information.

As described above, in the present technology, the header of the packet includes the time stamp on the first time axis indicating the start time of the corresponding sample period, and the payload of the packet includes the reference time information of the second time axis regarding the display timing, associated with the start time of the corresponding sample period. Therefore, it is possible to secure an association with the system timing at the time of transmission without changing the display timing in the text information of the subtitle, and the reception side can display the subtitle at an appropriate timing.

Note that, in the present technology, for example, the packet transmission unit may generate and transmit the packet in the sample period after the display start time indicated by the display timing information has passed. This enables to increase a display probability of the subtitle at the time of random access caused by channel switching, for example.

Furthermore, another concept of the present technology is a receiver including a reception unit that receives a packet in which a document of text information of a subtitle having display timing information is included in a payload in synchronization with a sample period, in which a time stamp on a first time axis indicating a start time of the corresponding sample period is included in a header of the packet, and the payload of the packet further includes reference time information of a second time axis regarding the display timing, associated with the start time of the corresponding sample period, and the receiver further includes a control unit that controls a display timing of the subtitle according to the text information of the subtitle on the basis of the time stamp and the reference time information.

In the present technology, the reception unit receives the packet in which the document of the text information of the subtitle having the display timing information is included in the payload in synchronization with the sample period. Here, the header of the packet includes the time stamp on the first time axis indicating the start time of the corresponding sample period. Furthermore, the payload of the packet further includes the reference time information of the second time axis regarding the display timing, associated with the start time of the corresponding sample period.

The control unit controls the display timing of the subtitle according to the text information of the subtitle on the basis of the time stamp and the reference time information. For example, the control unit may convert the display start time and the display end time indicated by the display timing information to a time on the first time axis by using the time stamp and the reference time information and control the display timing of the subtitle by using the converted time. Furthermore, for example, the control unit may perform control to immediately display the subtitle according to the text information of the subtitle when the display start time indicated by the display timing information is positioned previously.

In this way, in the present technology, the header of the packet includes the time stamp on the first time axis indicating the start time of the corresponding sample period, the payload of the packet includes the reference time information of the second time axis regarding the display timing, associated with the start time of the corresponding sample period, and the display timing of the subtitle according to the text information of the subtitle is controlled on the basis of the time stamp and the reference time information. Therefore, it is possible to display the subtitle at an appropriate timing.

Note that, in the present technology, for example, it is possible that the payload of the packet includes a first segment having the document of the text information of the subtitle and a second segment having the reference time information regarding the display timing, the first segment is associated with the second segment corresponding to the first segment with identification information, and the control unit controls the display timing of the subtitle according to the text information of the subtitle included in the first segment by using the reference time information included in the second segment associated with the first segment. With this control, it is possible to avoid that the display timing is controlled by using wrong reference time information.

Effects of the Invention

According to the present technology, it is possible to secure an association with a system timing at the time of transmission without changing a display timing in text information of a subtitle, and a reception side can display the subtitle at an appropriate timing. Note that the effects described herein are only exemplary and not limited to these. Furthermore, there may be an additional effect.

BRIEF DESCRIPTION OF DRAWINGS

FIG. 3 is a diagram to describe a TTML structure.

FIG. 4 is a diagram of an exemplary structure of each element of metadata, styling, and layout existing in a header (head) of the TTML structure.

FIG. 5 is a diagram of an exemplary structure of a body of the TTML structure.

FIG. 15 is a diagram of an exemplary structure of the subtitle PES packet (PES_packet) and an exemplary structure of "PES_data_byte_field( )".

FIG. 16 is a diagram of an exemplary definition of a TT subtitle segment type.

FIG. 17 is a diagram of an exemplary structure of a TTML segment and a content of main information in the exemplary structure and the like.

FIG. 18 is a diagram of an exemplary structure of the reference time segment and a content of main information in the exemplary structure and the like.

MODE FOR CARRYING OUT THE INVENTION

A mode for carrying out the present invention (referred to as "embodiment") will be described below. Note that the description will be made in the following order.

1. Embodiment
2. Modification

1. Embodiment

Exemplary Configuration of Transmission/Reception System

Figure 1:
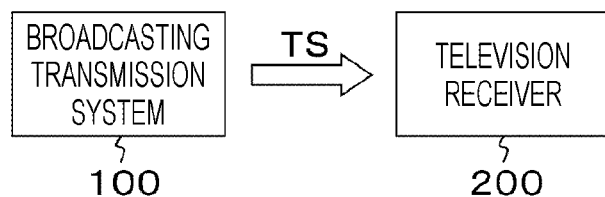
FIG. 1 is a block diagram of an exemplary configuration of a transmission/reception system according to an embodiment.

FIG. 1 is an exemplary configuration of a transmission/reception system 10 as an embodiment. The transmission/reception system 10 includes a broadcasting transmission system 100 and a television receiver 200.

The broadcasting transmission system 100 transmits an MPEG-2 transport stream (hereinafter simply referred to as "transport stream") TS as a multiplexed stream on a broadcast wave.

The transport stream TS has a subtitle stream together with a video stream and an audio stream. The video stream includes a video PES packet in which encoded image data is arranged in a payload. The audio stream includes an audio PES packet in which encoded audio data is arranged in a payload.

The subtitle stream includes a subtitle PES packet in which a document of text information of a subtitle having display timing information that is a segment packet having a TTML document (TTML document) in the embodiment is arranged in a payload. The subtitle PES packet is generated in synchronization with a sample period (fixed section).

A header of the subtitle PES packet includes a time scamp on a first time axis indicating a start time of the corresponding sample period. The time stamp is a so-called Presentation Time Stamp (PTS), and a time is indicated with a count value of 90 kHz. In this case, the PTS configures a sample start time. Regarding the PTS, timings are uniformly managed in the whole system.

Furthermore, the payload of the subtitle PES packet includes reference time information of a second time axis regarding a display timing (begin, end), associated with the start time of the corresponding sample period. The display timing (begin, end) is only a relative timing for each package of the TTML. The display timing is not synchronized with the system and is independent from timing management at the time of distribution. In the present embodiment, the reference time information is time information indicating the start time of the corresponding sample period, and in the reference time information, a time is indicated by an hour-minute-second frame.

The payload of the subtitle PES packet includes a first segment (TTML_segment) having the document of the text information of the subtitle described above and a second segment (Reftime_segment) having the reference time information regarding the display timing described above. Here, the first segment and the second segment corresponding to the first segment form a single pair (group), and the segments have the same identification information and are associated with each other. In a case where a plurality of subtitle contents which has been individually produced exists, the payload of the subtitle PES packet may include a plurality of pairs (group) of the first segments and the second segments. However, the pairs can be identified from each other with the identification information.

The television receiver 200 receives the transport stream TS transmitted on the broadcast wave from the broadcasting transmission system 100. As described above, the transport stream TS includes the subtitle stream together with the video stream and the audio stream. As described above, the subtitle stream is configured of the subtitle PES packet. The subtitle PES packet includes the first segment (TTML_segment) having the document of the text information of the subtitle and the second segment (Reftime_segment) having the reference time information regarding the display timing.

The television receiver 200 controls a timing to display the subtitle according to the text information of the subtitle on the basis of the time stamp and the reference time information. As described above, the time stamp is time information regarding the first time axis, and the reference time information is time information regarding the second time axis similarly to the display timing information included in the TTML. The television receiver 200 converts a display start time and a display end time indicated by the display timing information into a time on the first time axis and controls a subtitle display timing by using the converted time.

Here, the first segment and the second segment corresponding to the first segment form a single pair (group), and the segments have the same identification information and are associated with each other. The television receiver 200 controls the subtitle display timing according to the text information of the subtitle included in the first segment by using the reference time information included in the second segment which is associated with the first segment.

Note that to increase a display probability of the subtitle at the time of random access caused by channel switching, the subtitle PES packets including the same TTML document may be sequentially transmitted in synchronization with a plurality of sample periods. In that case, in each subtitle PES packet, times indicated by the reference time information included in the subtitle PES packets sequentially change as the corresponding sample period advances. In this case, the subtitle PES packet is generated and transmitted in a sample period after the display start time indicated by the display timing information has passed. When the display start time indicated by the display timing information is set before the start time of the sample period, a receiver 200 performs control to immediately display the subtitle.

Figure 2:
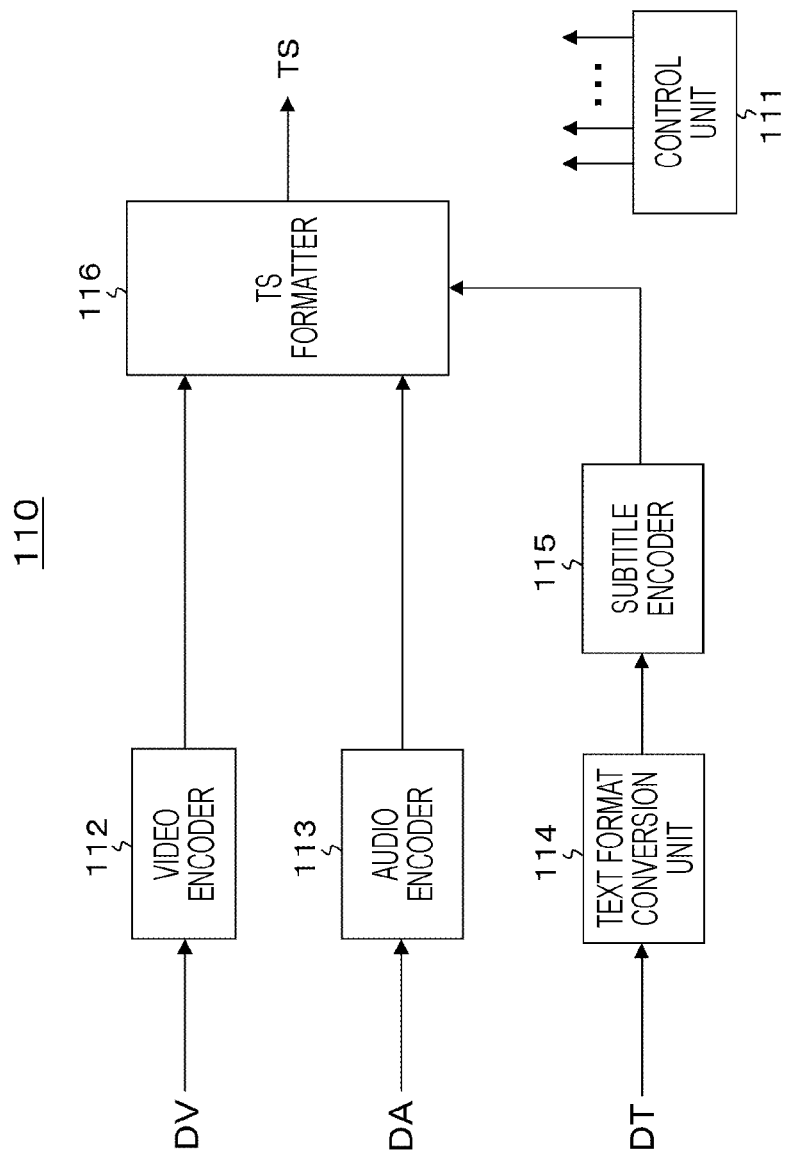
FIG. 2 is a block diagram of an exemplary configuration of a stream generation unit of a broadcast transmission system.

Exemplary Configuration of Stream Generation Unit of Broadcast Transmission System FIG. 2 is an exemplary configuration of a stream generation unit 110 of the broadcasting transmission system 100. The stream generation unit 110 includes a control unit 111, a video encoder 112, an audio encoder 113, a text format conversion unit 114, a subtitle encoder 115, and a TS formatter (multiplexer) 116.

The control unit 111 includes, for example, a Central Processing Unit (CPU) and controls operations of the units in the stream generation unit 110. The video encoder 112 receives image data DV, encodes the image data DV, and generates a video stream (PES stream) including the video PES packet having the encoded image data in the payload. The audio encoder 113 receives audio data DA, encodes the audio data DA, and generates an audio stream (PES stream) including the audio PES packet having the encoded audio data.

The text format conversion unit 114 receives text data (character code) as subtitle information and data DT including display control information of the text data and obtains text information of the subtitle in a predetermined format having the display timing information. As the text information, for example, it is considered to use the TTML or a format derived from the TTML. In the present embodiment, the TTML is used.

FIG. 3 is an exemplary structure of a document (file) of the TTML. The TTML is described on the basis of XML. In the TTML, head (head) and body (body) exist. Furthermore, each element of metadata (metadata), styling (styling), and layout (layout) exists in the head (head).

FIG. 4(*a*) illustrates an exemplary structure of the metadata (TTM: TTML Metadata). The metadata includes information regarding a title of the metadata and information regarding a copyright.

FIG. 4(*b*) illustrates an exemplary structure of the styling (TTS: TTML Styling). In addition to an identifier (id), the styling includes information such as a color (color), a font (fontFamily), a size (fontSize), alignment (textAlign), and the like.

FIG. 4(*c*) illustrates an exemplary structure of the layout (region: TTML layout). In addition to an identifier (id) of a region where the subtitle is arranged, the layout includes information such as a range (extent), an offset (padding), a background color (backgroundColor), alignment (displayAlign), and the like.

FIG. 5 illustrates an exemplary structure of the body (body). In the example in FIG. 5, information regarding a subtitle 1 (subtitle 1) is included. The display start time and the display end time are described, and the text data is described. For example, regarding the subtitle 1 (subtitle 1), a display start timing is "3 s", a display end timing is "6 s", and the text data is "I'm going to the station now".

Returning to FIG. 2, the subtitle encoder 115 generates a TTML segment (TTML_segment) including a TTML document obtained by the text format conversion unit 114. Then, the subtitle encoder 115 generates a subtitle stream (PES stream) including a subtitle PES packet in which the TTML segment is arranged in the payload.

The subtitle encoder 115 generates the subtitle PES packet in synchronization with the sample period and inserts the time stamp on the first time axis indicating the start time of the corresponding sample period to the header of the subtitle PES packet as a PTS. On the first time axis, a time is indicated by a count value of 90 kHz.

Figure 6:
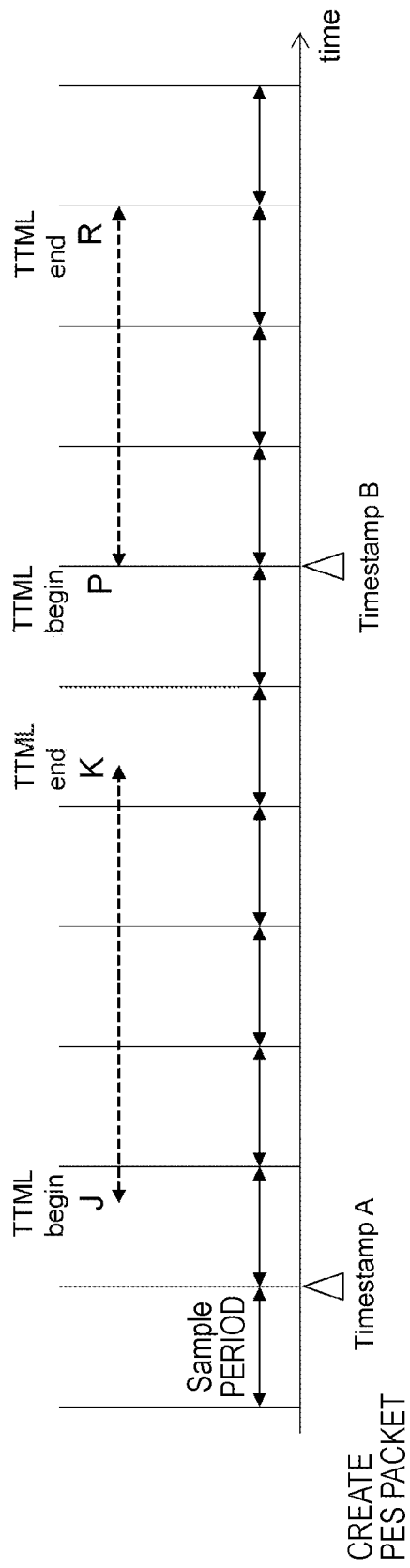
FIG. 6 is a diagram of an exemplary generation timing of a subtitle PES packet.

FIG. 6 illustrates an exemplary generation timing of the subtitle PES packet. In FIG. 6, a vertical line indicates a boundary between the sample periods (fixed section). In this example, in synchronization with a certain sample period, a subtitle PES packet having a time stamp A (Timestamp A) indicating a start time of the sample period as a PTS is generated. The payload of the subtitle PES packet includes a TTML segment (TTML_segment) having a TTLM document having display timing information in which a display start time is "J" and a display end time is "K".

Furthermore, in this example, in synchronization with a certain sample period, a subtitle PES packet having a time time stamp B (Timestamp B) indicating a start time of the sample period as a PTS is generated. The payload of the subtitle PES packet includes a TTML segment (TTML_segment) having a TTLM document having display timing information in which a display start time is "P" and a display end time is "R".

Furthermore, the subtitle encoder 115 generates a reference time segment (Reftime_segment) having reference time information of the second time axis regarding the display timing which is associated with the start time of the corresponding sample period, on the basis of timing management by the control unit 111. Then, the subtitle encoder 115 includes the reference time segment (Reftime_segment) in the payload of the subtitle PES packet. On the second time axis, a time is indicated by an hour-minute-second frame.

Figure 7:
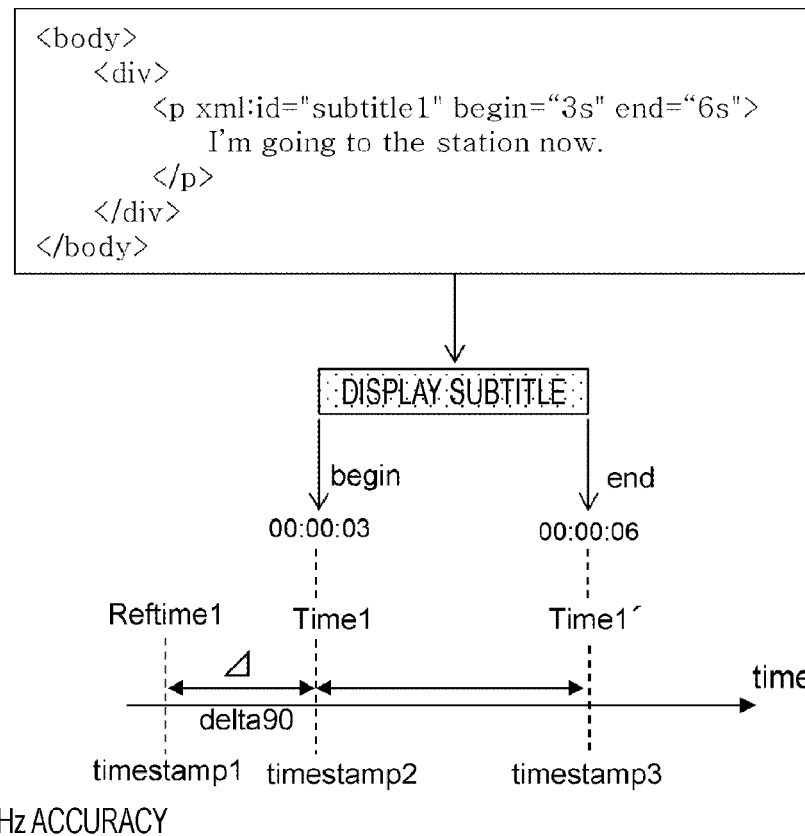
FIG. 7 is a diagram to describe reference time information.

With reference to FIG. 7, the reference time information will be further described. A time on the first time axis corresponding to the start of the sample period is assumed as a "timestamp1". Furthermore, the display timing (begin, end) of the subtitle (subtitle) is time information of the second time axis. It is assumed that the display start time (begin) be "Time1", the time on the second time axis corresponding to the start of the sample period be "Reftime1", and a difference between "Time1" and "Reftime1" be Δ. In this case, "Reftime1" is the reference time information.

By inserting the reference time information to the payload of the subtitle PES packet and transmitting the reference time information, a reception side can convert the display timing (begin, end) of the subtitle which is the time information of the second time axis into the first time axis and control the display timing of the subtitle by using the converted time.

The following formula (1) indicates a conversion formula to obtain "delta90" which is a value of 90 kHz accuracy corresponding to the period of Δ. Furthermore, the following formula (2) indicates a conversion formula to obtain "timestamp2" which is a time on the first time axis corresponding to the display start time (begin) on the second time axis. In addition, the following formula (3) indicates a conversion formula to obtain "Timestamp3" which is a time on the first time axis corresponding to the display end time (end) of the second time axis. Note that it is assumed that the display end time (end) be "Time1'". Furthermore, in these formulas, a unit of each of Time1, Reftime1, and Time1' is "seconds".

$$\text{delta90}=(\text{Time1}-\text{Reftime1}*90K \qquad (1)$$

$$\text{timestamp2}=\text{timestamp1}+\text{delta90} \qquad (2)$$

$$\text{timestamp3}=\text{timestamp2}+(\text{Time1}'-\text{Time1})*90K \qquad (3)$$

Note that in the above, m general case where the display start time "Time1" is larger than the time "Reftime1" is described. However, the display start time "Time1" may coincide with the time "Reftime1". In that case, "Reftime1" to be the reference time information is set to "Time1". In this case, the transmission of the reference time information can be omitted.

Figure 8:
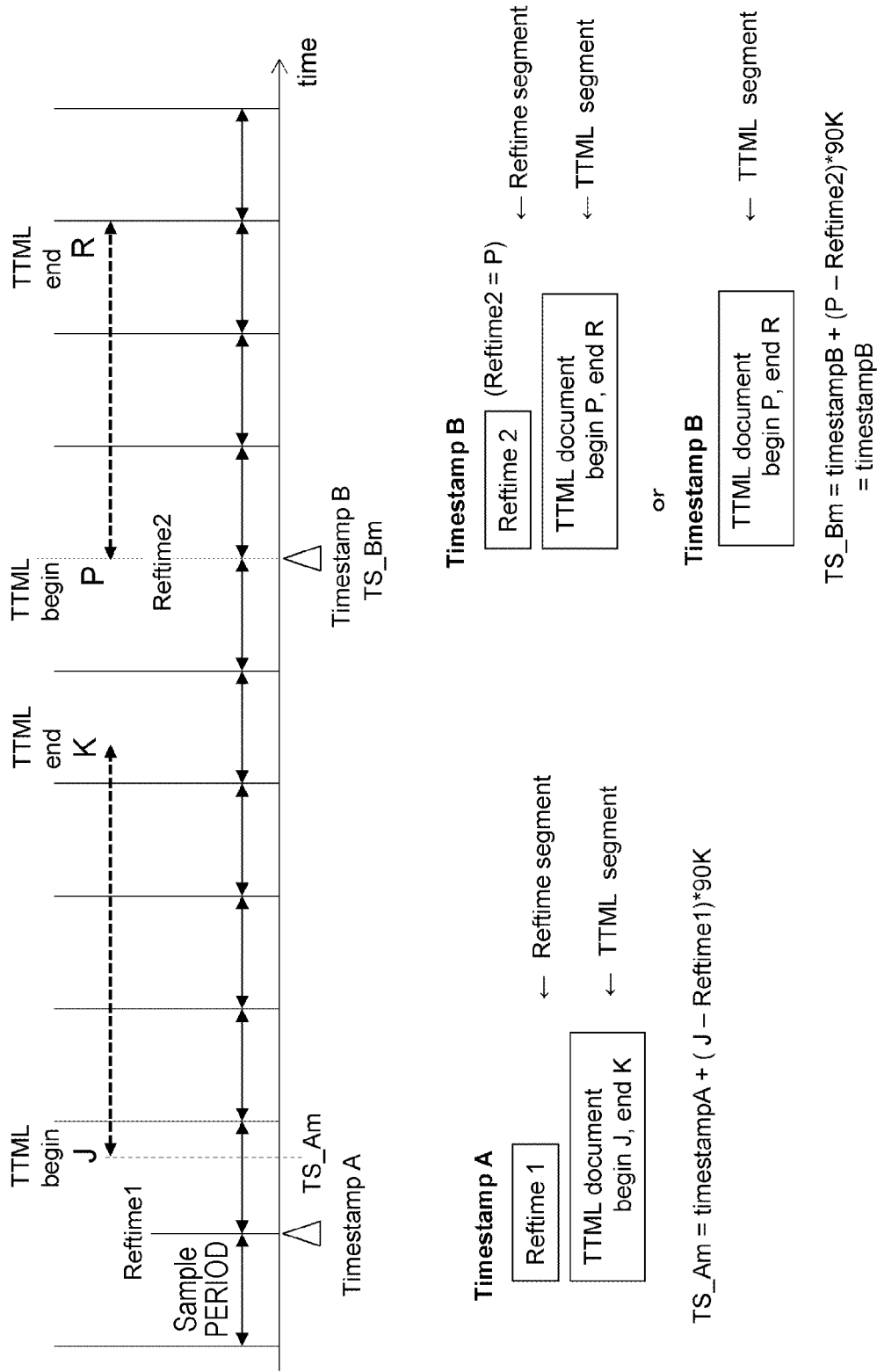
FIG. 8 is a schematic diagram of an exemplary content (packet structure) of the subtitle PES packet.

FIG. 8 is a schematic diagram of an exemplary content (packet structure) of the subtitle PES packet. This example corresponds to FIG. 6 described above. The payload of the subtitle PES packet having the time stamp A (Timestamp A) as the PTS includes the TTML segment (TTML_segment) having the TTLM document with the display timing information in which the display start time is "J" and the display end time is "K" and includes the reference time segment (Reftime_segment) having the reference time information "Reftime1".

In this case, the reception side can obtain "Ts_Am" which is a time on the first time axis having 90 kHz accuracy corresponding to the display start time (begin) on the second time axis, for example, by the following formula (4).

$$\text{TS\_Am}=\text{timestampA}+(J?\text{Reftime1})*90K \qquad (4)$$

Furthermore, the payload of the subtitle PES packet having the time stamp B (Timestamp B) as the PTS includes the TTML segment (TTML_segment) having the TTLM document with the display timing information in which the display start time is "P" and the display end time is "R" and includes the reference time segment (Reftime_segment) having the reference time information "Reftime2". Furthermore, in this case, the insertion of the reference time segment (Reftime_segment) can be omitted.

In this case, the reception side can obtain "Ts_Bm" which is a time on the first time axis having 90 kHz accuracy corresponding to the display start time (begin) on the second time axis, for example, by the following formula (5).

$$TS\_Bm = timestampB + (P?Reftime2)*90K \quad (5)$$
$$= timestampB$$

Figure 9:
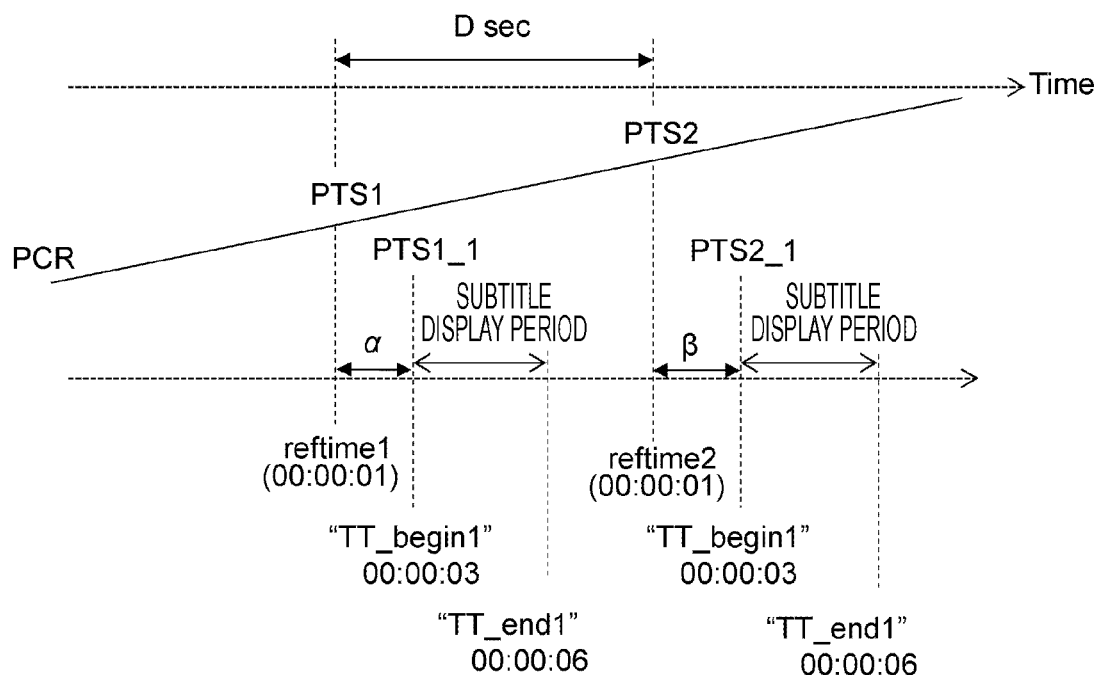
FIG. 9 is a schematic diagram of an exemplary content of a subtitle PES packet in a case of rebroadcasting.

FIG. 9 schematically illustrates an exemplary content of a subtitle PES packet in a case where the same TTML document is redistributed in different broadcasting time zones, for example, in a case of rebroadcasting. A time scamp of PTS1 is attached at the time of original broadcasting, and a time stamp of PTS2 is attached at the time of rebroadcasting. In the payload, a TTML segment (TTML_segment) having a TTLM document with display timing information in which a display start time is "00:00:03" and a display end time is "00:00:06" is included at the times of original broadcasting and rebroadcasting.

Furthermore, in the payload, a reference time segment (Reftime_segment) having "00:00:01" as the reference time information "Reftime1" is included at the time of original broadcasting, and a reference time segment (Reftime_segment) having "00:00:01" as the reference time information "Reftime2" is included at the time of rebroadcasting. In this case, α which is a time delay from PTS1 to PTS1_1 which is the display start time is equal to β which is a time delay from PTS2 to PTS2_1 which is the display start time. On the other hand, it is possible to respectively set different values to "Reftime1" and "Reftime2". In this case, the delay amounts α and β are different from each other.

As a result, the reception side can obtain "PTS1_1" which is a time on the first time axis having 90kHz accuracy corresponding to the display start time (begin) on the second time axis by the following formula (6) at the time of original broadcasting.

$$PTS1\_1=PTS1+(3 \text{ sec}?1 \text{ sec})*90K \quad (6)$$

Furthermore, the reception side can obtain "PTS2_1" which is a time on the first time axis having 90kHz accuracy corresponding to the display start time (begin) on the second time axis by the following formula (7) at the time of rebroadcasting. With this processing, the display timing of the subtitle can be controlled at the time of rebroadcasting, similarly to the time of the original broadcasting.

$$PTS2\_1=PTS2+(3 \text{ sec}?1 \text{ sec})*90K \quad (7)$$

Note that, in the example in FIG. 8, the subtitle PES packet including the TTLM document having the display timing information in which the display start time is "J" and the display end time is "K" is transmitted only once in the sample period, and the subtitle PES packet including the TTLM document having the display timing information in which the display start time is "P" and the display end time is "R" is similarly transmitted only once in the sample period.

However, to increase the display probability of the subtitle at the time of random access caused by channel switching, it is considered to sequentially generate the subtitle PES packets including the same TTLM document in synchronization with the sample period and sequentially transmit the generated packets. In that case, in each subtitle PES packet, times indicated by the reference time information included in the subtitle PES packets sequentially change as the corresponding sample period advances.

Figure 10:
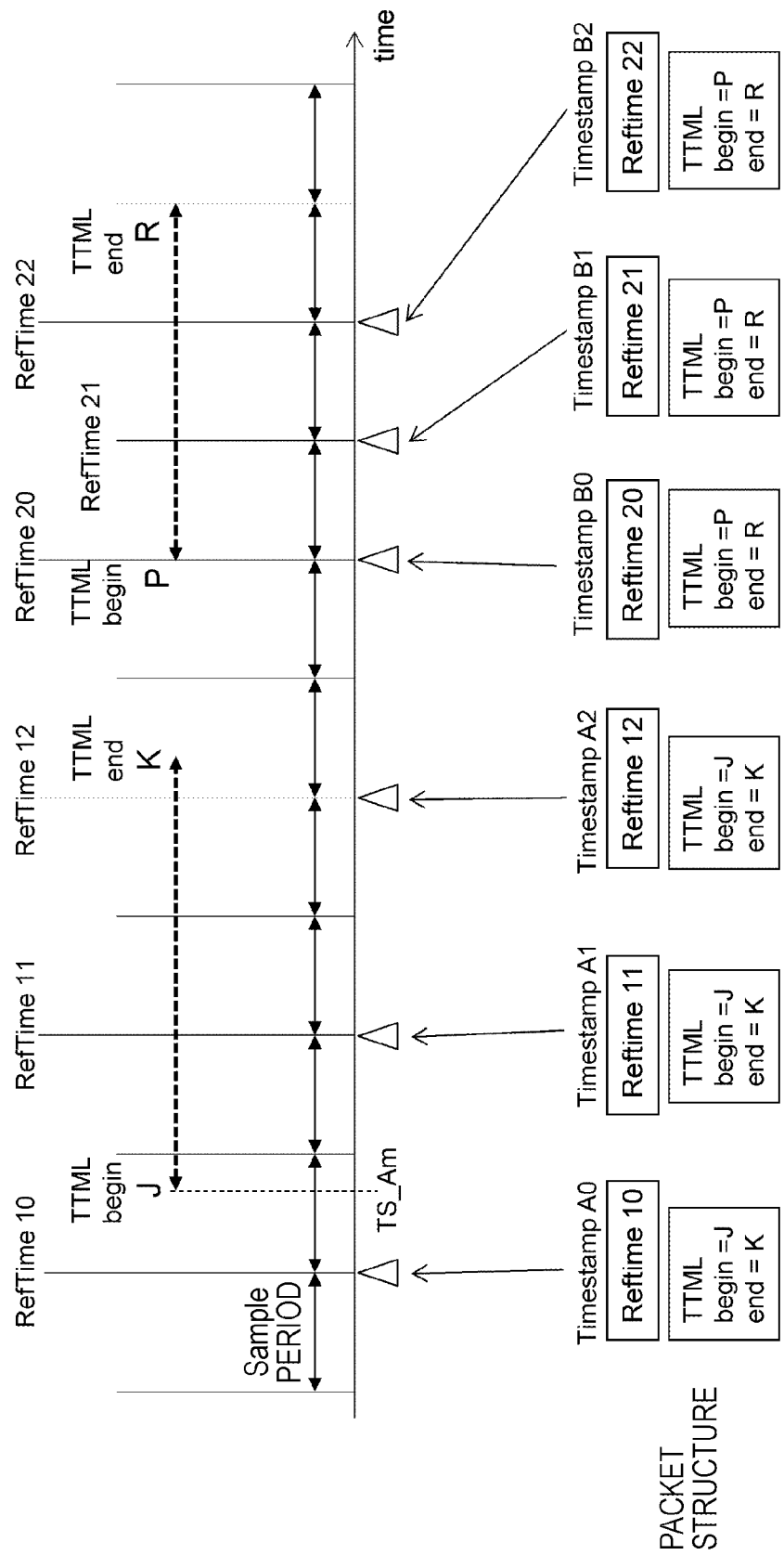
FIG. 10 is a schematic diagram of an exemplary content (packet structure) of the subtitle PES packet.

FIG. 10 is a schematic diagram of an exemplary content (packet structure) of the subtitle PES packet. All the subtitle PES packets having a time stamp A0 (Timestamp A0), a time stamp A1 (Timestamp A1), and a time stamp A2 (Timestamp A2) have the TTLM document with the display timing information in which the display start time is "J" and the display end time is "K" in the payloads. However, the reference time information included in the subtitle PES packets changes to "Reftime10", "Reftime11", and "Reftime12". In this case, in the subtitle PES packets having the time stamps A1 and A2, the display start time "J" is before the time indicated in the reference time information. The reception side can find that the display start time has already passed.

Furthermore, similarly, all the subtitle PES packets having a time stamp B0 (Timestamp B0), a time stamp B1 (Timestamp B1), and a time stamp B2 (Timestamp B2) have the TTLM document with the display timing information in which the display start time is "P" and the display end time is "R" in the payloads. However, the reference time information included in the subtitle PES packets changes to "Reftime20", "Reftime21", and "Reftime22". In this case, in the subtitle PES packets having the time stamps B1 and B2, the display start time "P" is before the time indicated in the reference time information. The reception side can find that the display start time has already passed.

Note that, in the above, an example has been described in which the payload of the subtitle PES packet includes the TTML segment (TTML_segment) and the reference time segment (Reftime_segment) regarding the single subtitle content. However, it is considered to include TTML segments and reference time segments regarding a plurality of subtitle contents which has been individually produced in the payload of the subtitle PES packet.

That is, one or more pairs (group) of the TTML segments and the reference time segments may be included in the payload of the subtitle PES packet. In consideration of this, as will be described later, in each pair, the TTML segment and the reference time segment are associated with each other with identification information "segment_associate_id".

Figure 11:
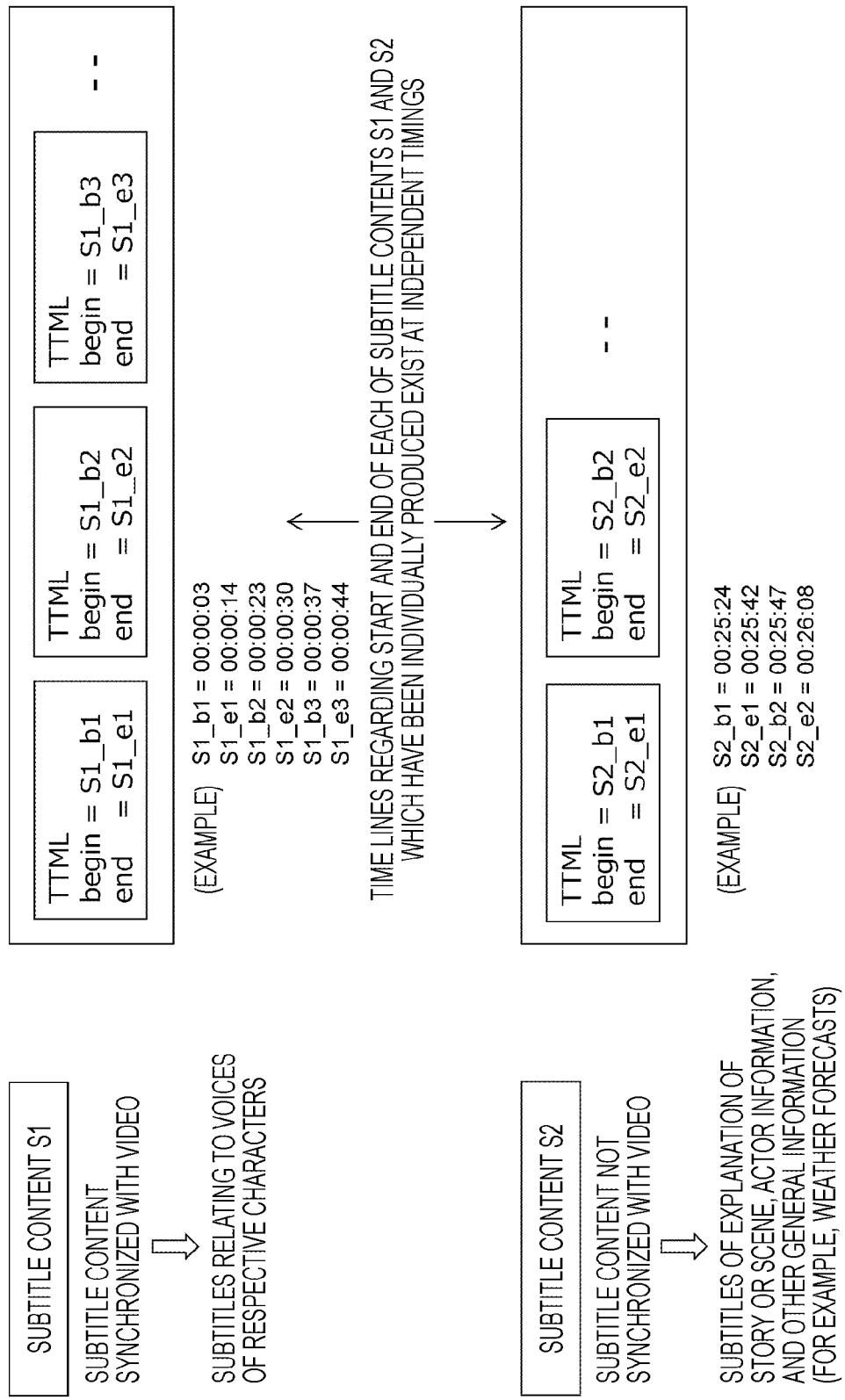
FIG. 11 is a diagram of an example of two subtitle contents which have been individually produced.

FIG. 11 illustrates an example of two subtitle contents which have been individually produced. For example, a subtitle content S1 is synchronized with a video, and subtitles relating to voices of respective characters are displayed by using the subtitle content S1. Furthermore, for example, a subtitle content S2 is not synchronized with a video, and subtitles of explanation of a story or a scene, actor information, and other general information (for example, weather forecasts and the like) are displayed by using the subtitle content S2.

Figure 12:
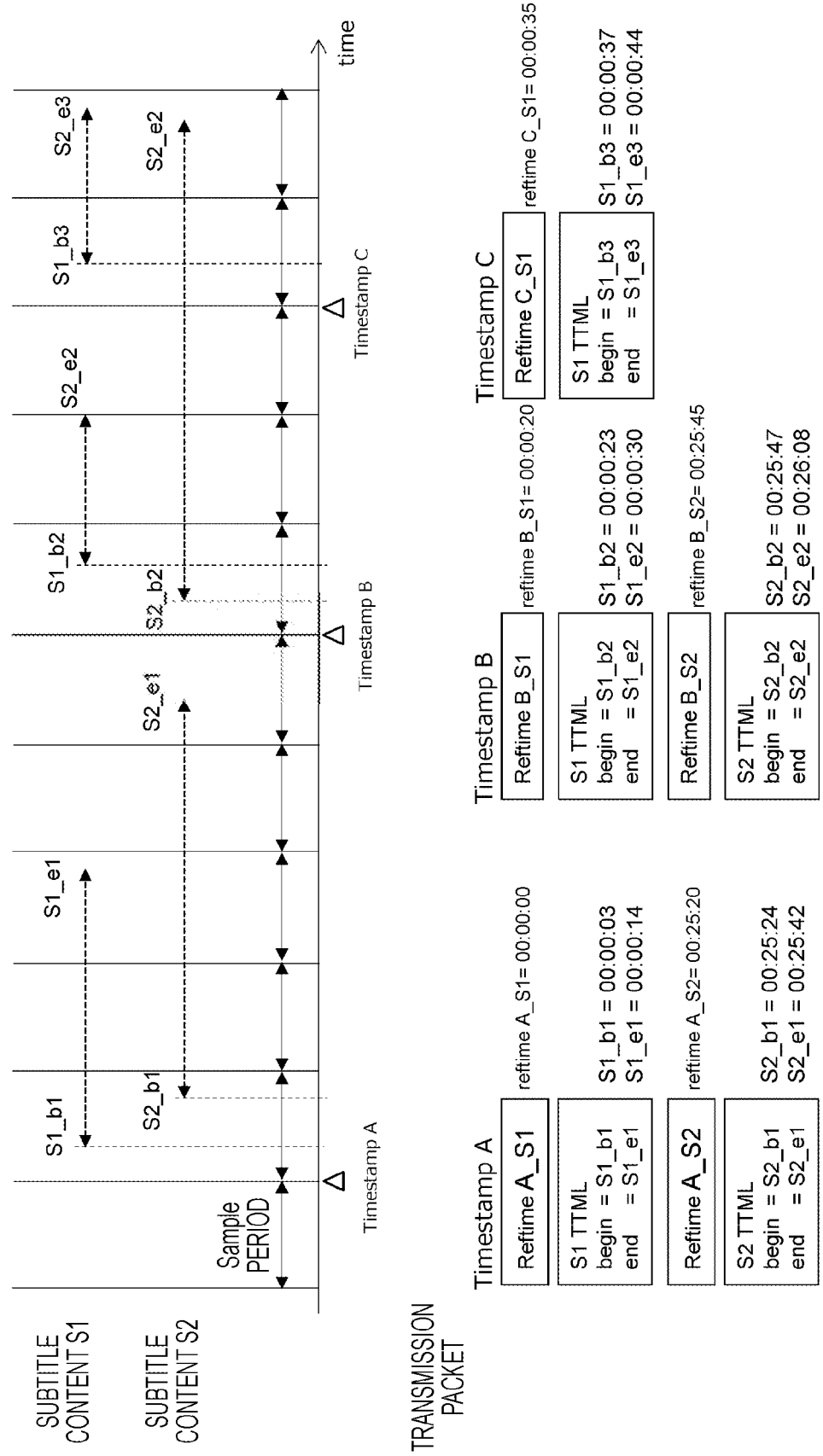
FIG. 12 is a schematic diagram of an exemplary content (packet structure) of a subtitle PES packet in a case where subtitle contents S1 and S2 exist.

FIG. 12 schematically illustrates an exemplary content (packet structure) of a subtitle PES packet in a case where the subtitle contents S1 and S2 exist. A payload of a subtitle PES packet having a time stamp A (Timestamp A) as a PTS includes a TTML segment "S1 TTML" having a TTLM document with display timing information in which a display start time regarding the subtitle content S1 is "S1_b1" and a display end time is "S1_e1", and the payload includes a reference time segment "Reftime A_S1" having reference time information "A_S1".

Furthermore, in the subtitle PES packet, the payload includes a TTML segment "S2 TTML" having a TTLM document with display timing information in which a display start time regarding the subtitle content S2 is "S2_b1"

and a display end time is "S2_e1" and includes a reference time segment "Reftime A_S2" having reference time information "A_S2".

Furthermore, a payload of a subtitle PES packet having a time stamp B (Timestamp B) as a PTS includes a TTML segment "S1 TTML" having a TTLM document with display timing information in which a display start time regarding the subtitle content S1 is "S1_b2" and a display end time is "S1_e2", and the payload includes a reference time segment "Reftime B_S1" having reference time information "B_S1".

Furthermore, in the subtitle PES packet, the payload includes a TTML segment "S2 TTML" having a TTLM document with display timing information in which a display start time regarding the subtitle content S2 is "S2_b2" and a display end time is "S2_e2" and includes a reference time segment "Reftime B_S2" having reference time information "B_S2".

In addition, a payload of a subtitle PES packet having a time stamp C (Timestamp C) as a PTS includes a TTML segment "S1 TTML" having a TTLM document with display timing information in which a display start time regarding the subtitle content S1 is "S1_b3" and a display end time is "S1_e3", and the payload includes a reference time segment "Reftime C_S1" having reference time information "C_S1".

Figure 13:
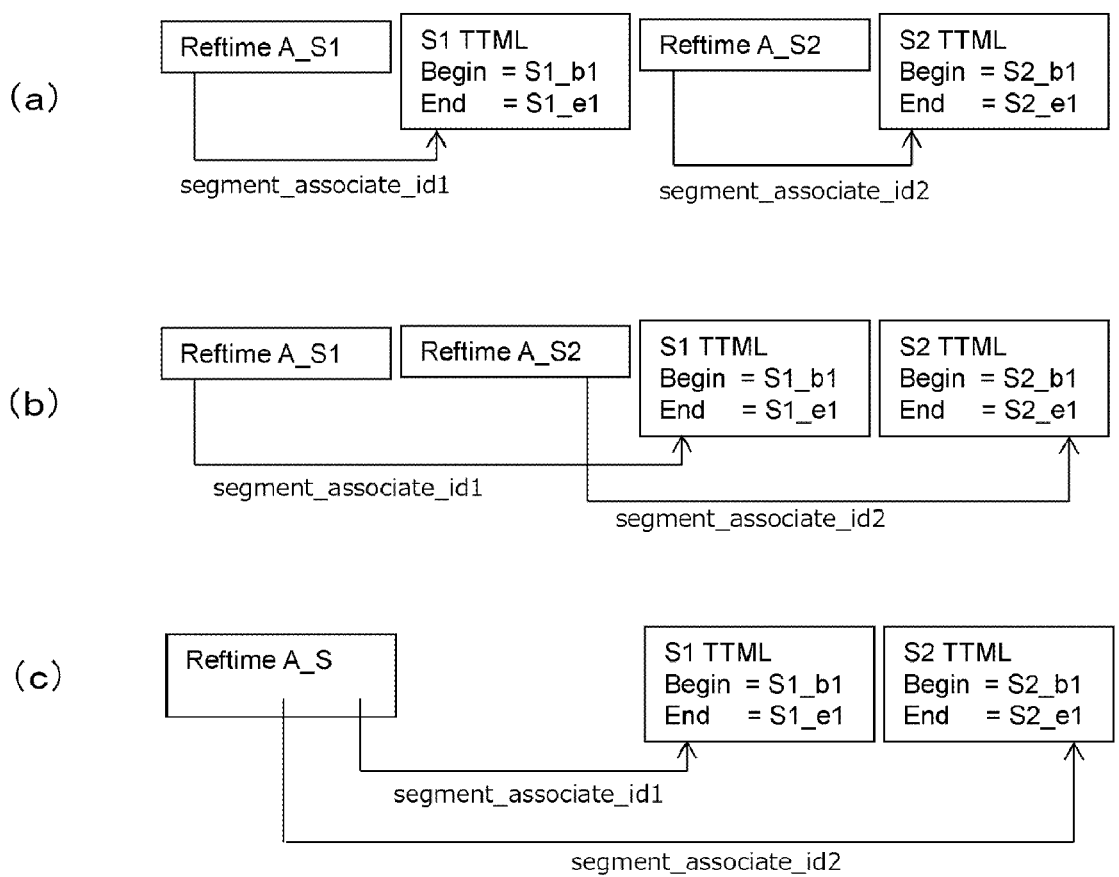
FIG. 13 is a diagram of an exemplary arrangement sequence in a case where TTLM documents and reference time segments regarding the subtitle contents S1 and S2 exist in the subtitle PES packet.

FIG. 13 is a diagram of an exemplary arrangement sequence in a case where TTLM documents and reference time segments regarding the subtitle contents S1 and S2 exist in the subtitle PES packet. This example corresponds to the subtitle PES packet having the time stamp A (Timestamp A) in FIG. 12 as the PTS.

In FIG. 13(a), a reference time segment "Reftime A_S1", a TTLM document "S1 TTML", the reference time segment "Reftime A_S2", and a TTML segment "S2 TTML" are arranged in this sequence. In FIG. 13(b), the reference time segment "Reftime A_S1", the reference time segment "Reftime A_S2", the TTLM document "S1 TTML", and the TTML segment "S2 TTML" are arranged in this sequence. These arrangement sequences are merely an example, and other arrangement sequence may be used. Note that the reference time segment "Reftime A_S1" and the TTLM document "S1 TTML" are associated with each other with identification information "segment_associate_id1", and the reference time segment "Reftime A_S2" and the TTML segment "S2 TTML" are associated with each other with "segment_associate_id2".

Furthermore, as illustrated in FIG. 13(c), a single reference time segment "Reftime A", the TTLM document "S1 TTML", and the TTML segment "S2 TTML" may be arranged. In this case, the single reference time segment "Reftime A_S" includes a plurality of pieces of association information, and the TTLM document "S1 TTML" is associated with "segment_associate_id1", and the TTLM document "S2 TTML" is associated with "segment_associate_id2".

Figure 14:
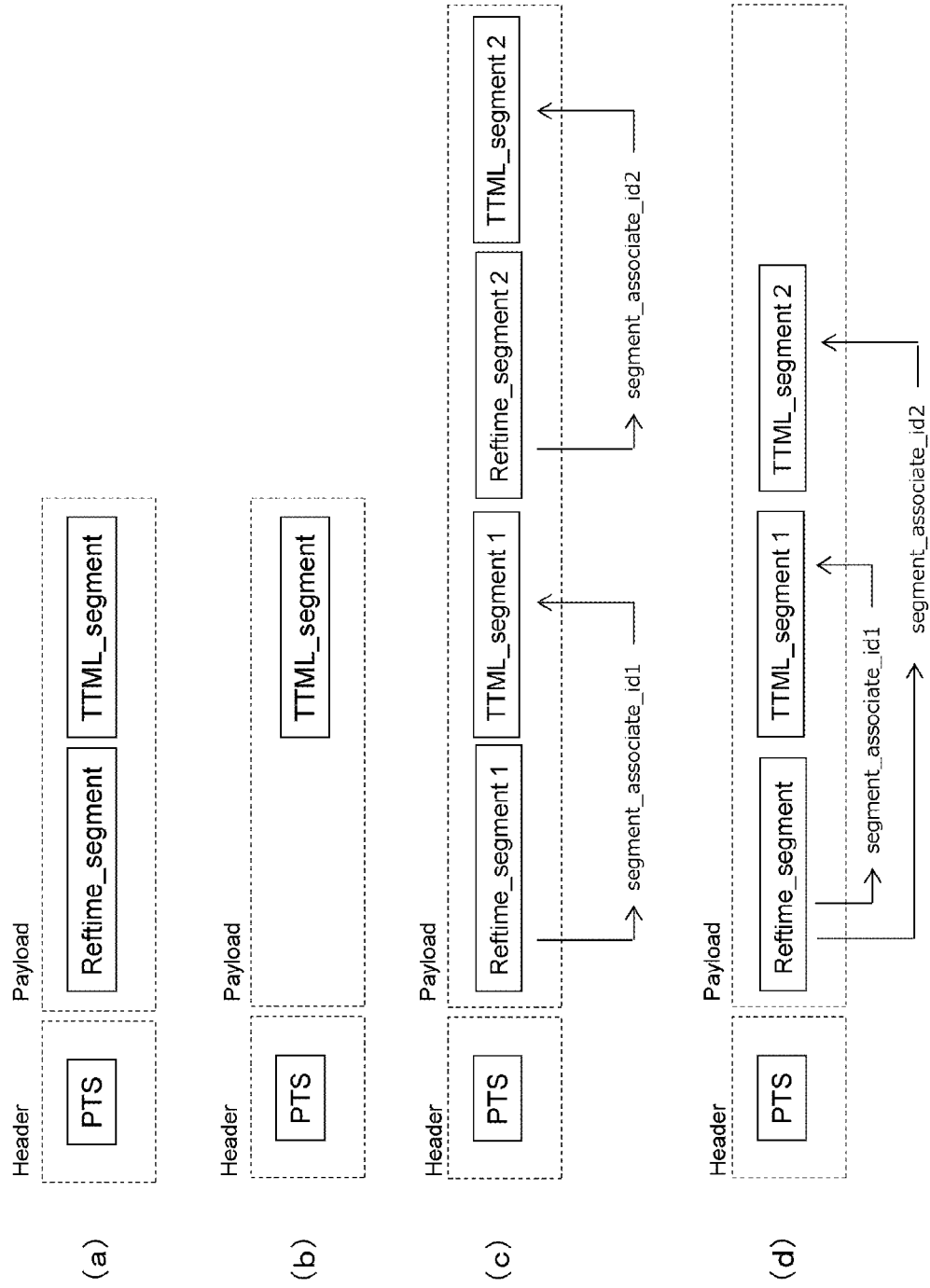
FIG. 14 is a diagram of an exemplary structure of the subtitle PES packet.

FIG. 14 illustrates an exemplary structure of a subtitle PES packet. FIG. 14(a) illustrates a case where data of a single subtitle content is included. A PTS is included in a header, and a single pair of a reference time segment and a TTML segment exists in a payload. FIG. 14(b) is a modification of FIG. 14(a) and is a case where transmission of reference time information is omitted, and only the TTML segment exists in the payload.

FIG. 14(c) illustrates a case where data of a plurality of, here, two subtitle contents are included. The PTS is included in the header, and two pairs of the reference time segments and the TTML segments exist in the payload. FIG. 14(d) illustrates a case where data of a plurality of, here, two subtitle contents are included. The PTS is included in the header, and a single reference time segment and two TTML segments exist in the payload.

FIG. 15(a) illustrates an exemplary structure of a subtitle PES packet (PES_packet). A fixed pattern of "0x000001" is arranged in a 24-bit field of "PES_startcode_prefix". An 8-bit field of "stream_id" indicates a stream identifier. In a case of the subtitle PES packet, "10111101" which is a value indicating "private stream1" in described. A 16-bit field of "PES_packet_length" indicates the number of subsequent bytes as a length (size) of a PES packet.

After "PES_packet_length", a field of "Optional_PES_header( )" exists. In this field, a time stamp such as a PTS and a DTS is arranged. After this field, a field of "PES_packet_data_byte" exists. This field corresponds to a PES payload. In this field, "PES_data_byte_field( )" for containing data is arranged.

FIG. 15(b) illustrates an exemplary structure of "PES_data_byte_field( )". An 8-bit field of "data_identifier" indicates an identifier for identifying a kind of data with a container portion. Since the conventional subtitle (in a case of bitmap) is supposed to be indicated by "0x20". a text can be identified with a new value, for example, "0x21".

An 8-bit field of "subtitle_stream_id" indicates an identifier for identifying a kind of a subtitle stream. In a case of a subtitle stream for transmitting text information, for example, a new value "0x01" is arranged, and the subtitle stream can be distinguished from a conventional subtitle stream "0x00" for transmitting a bit map.

After the field of "subtitle_stream_id", a field of "Subitling_segments( )" exists after a pattern of "00001111". A segment packet is arranged in this field. After this field, an 8-bit field of "end_of_PES_data_field_marker" exists. This field is a marker indicating the end of the PES packet.

FIG. 16 illustrates an exemplary definition of a TT subtitle segment type (TT_subtitle segment_type). A character string of "0xA0" indicates a TTML segment (TTML_segment). A character string of "0xA1" indicates a reference time segment (Reftime_segment).

FIG. 17(a) illustrates an exemplary structure (Syntax) of the TTML segment (TTML_segment). FIG. 17(b) illustrates a content (Semantics) of main information in the exemplary structure and the like. An 8-bit field of "sync_byte" is a unique word indicating the start of a segment. An 8-bit field of "segment_type" indicates a kind of the segment (segment type). Here, a character string of "0xA0" indicating that the segment is a TTML segment (TTML_segment) is arranged.

A 16-bit field of "segment_length" indicates the number of subsequent bytes as a length (size) of a subtitle segment. A 4-bit field of "TTML_version_number" indicates an update version of information. In a case where the information is updated, a value is incremented by one. An 8-bit field of "segment_associate_id" indicates identification information used for identifying mutually associated segments. In a field of "segment_payload( )", a TTML document is arranged.

FIG. 18(a) illustrates an exemplary structure (Syntax) of a reference time segment (Reftime_segment). FIG. 18(b) illustrates a content (Semantics) of main information in the exemplary structure and the like. An 8-bit field of "sync_byte" is a unique word indicating the start of a segment. An 8-bit field of "segment_type" indicates a kind of the segment (segment type). Here, a character string of "0xA1" indicating the reference time segment (Reftime_segment) is arranged.

A 16-bit field of "segment_length" indicates the number of subsequent bytes as a length (size) of a subtitle segment. A 4-bit field of "reftime_version_number" indicates an update version of information. In a case where the information is updated, a value is incremented by one. An 8-bit field of "number_of_reftime_targets" indicates the number of targets to which "reftime" is supplied. An 8-bit field of "segment_associate_id" indicates identification information used for identifying mutually associated segments.

An 8-bit field of "reftime_hour" indicates an hour described in a decimal of the reference time information. An 8-bit field of "reftime_minute" indicates a minute described in a decimal of the reference time information. An 8-bit field of "reftime_second" indicates a second described in a decimal of the reference time information. An 8-bit field of "reftime_frame" indicates a frame described in a decimal of the reference time information.

Returning to FIG. 2, the TS formatter 116 TS-packetizes and multiplexes the video stream generated by the video encoder 112, the audio stream generated by the audio encoder 113, and the subtitle stream generated by the subtitle encoder 115 to obtain a transport stream TS as a multiplexed stream.

An operation of the stream generation unit 110 illustrated in FIG. 2 will be briefly described. The image data DV is supplied to the video encoder 112. The video encoder 112 encodes the image data DV and generates a video stream (PES stream) including a video PES packet having encoded image data in a payload. The video stream is supplied to the TS formatter 116.

Furthermore, the audio data DA is supplied to the audio encoder 113. The audio encoder 113 encodes the audio data DA and generates an audio stream (PES stream) including an audio PES packet having encoded audio data. The audio stream is supplied to the TS formatter 116.

Furthermore, the data DT including the text data (character code) as the subtitle information and display control information of the data is supplied to the text format conversion unit 114. The text format conversion unit 114 obtains text information of a subtitle in a predetermined format having display timing information, here, a TTML. The TTML is supplied to the subtitle encoder 115.

The subtitle encoder 115 generates a TTML segment (TTML_segment) including a TTML document obtained by the text format conversion unit 114. Then, the subtitle encoder 115 generates a subtitle stream (PES stream) including a subtitle PES packet in which the TTML segment is arranged in the payload.

The subtitle encoder 115 generates the subtitle PES packet in synchronization with a sample period and inserts a time stamp (90 kHz accuracy) on a first time axis indicating a start time of the corresponding sample period to a header of the subtitle PES packet as a PTS.

Furthermore, the subtitle encoder 115 generates a reference time segment (Reftime_segment) having reference time information (hour-minute-second frame) of a second time axis regarding a display timing, associated with the start time of the corresponding sample period, on the basis of timing management by the control unit 111. Then, the subtitle encoder 115 makes the reference time segment (Reftime_segment) be included in the payload of the subtitle PES packet.

The subtitle stream generated by the subtitle encoder 115 is supplied to the TS formatter 116. The TS formatter 116 TS-packetizes and multiplexes the stream generated by each encoder and generates the transport stream TS as a multiplexed stream.

Exemplary Configuration of Television Receiver

Figure 19:
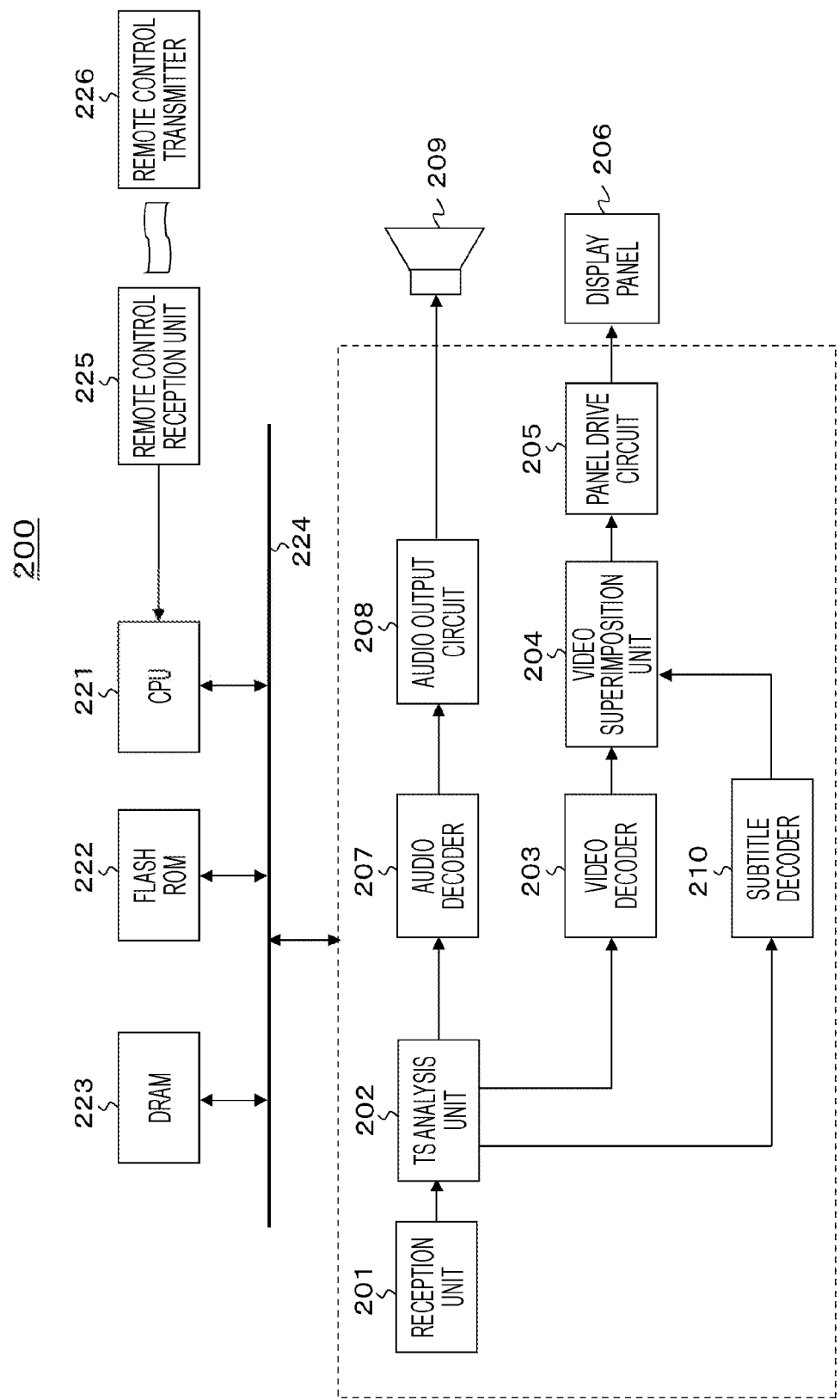
FIG. 19 is a block diagram of an exemplary configuration of a television receiver.

FIG. 19 illustrates an exemplary configuration of the television receiver 200. The television receiver 200 includes a reception unit 201, a TS analysis unit (demultiplexer) 202, a video decoder 203, a video superimposition unit 204, a panel drive circuit 205, and a display panel 206. Furthermore, the television receiver 200 includes an audio decoder 207, an audio output circuit 208, a speaker 209, and a subtitle decoder 210. In addition, the television receiver 200 further includes a CPU 221, a flash ROM 222, a DRAM 223, an internal bus 224, a remote control reception unit 225, and a remote control transmitter 226.

The CPU 221 controls an operation of each unit of the television receiver 200. The flash ROM 222 stores control software and holds data. The DRAM 223 configures a work area of the CPU 221. The CPU 221 develops software and data read from the flash ROM 222 on the DRAM 223 to activate the software and controls each unit of the television receiver 200.

The remote control reception unit 225 receives a remote control signal (remote control code) transmitted from the remote control transmitter 226 and supplies the signal to the CPU 221. The CPU 221 controls each unit of the television receiver 200 on the basis of the remote control code. The CPU 221, the flash ROM 222, and the DRAM 223 are connected to the internal bus 224.

The reception unit 201 receives the transport stream TS transmitted from the broadcasting transmission system 100 on a broadcast wave. As described above, the transport stream TS includes a video stream, an audio stream, and a subtitle stream. The TS analysis unit 202 extracts the video stream, the audio stream, and the subtitle stream from the transport stream TS.

The audio decoder 207 decodes an audio PES packet included in the audio stream extracted by the TS analysis unit 202 to obtain audio data. The audio output circuit 208 performs necessary processing such as D/A conversion and amplification on the audio data and supplies the data to the speaker 209. The video decoder 203 decodes a video PES packet included in the video stream extracted by the TS analysis unit 202 to obtain image data.

The subtitle decoder 210 decodes a subtitle PES packet included in the subtitle stream extracted by the TS analysis unit 202 to obtain bit map data of each region (subtitle graphics data) to be superimposed on the image data. As described above, the payload of the subtitle PES packet includes the TTML segment including the TTML document (refer to FIGS. 3 to 5 and FIG. 17) and the reference time segment having the reference time information (refer to FIG. 18). The subtitle decoder 210 extracts the TTML document from the TTML segment and obtains the bit map data of each region on the basis of the TTML document.

Furthermore, the subtitle decoder 210 extracts information regarding the display timing (begin, end) of each region from the body of the TTML document (refer to FIG. 5) and transmits the information to the CPU 221. The display timing (begin, end) is only a relative timing for each package of the TTML. The display timing is not synchronized with the system and is independent from timing management at the time of distribution.

Furthermore, the subtitle decoder 210 extracts the reference time information of the second time axis regarding the display timing of each region from the reference time segment and transmits the information to the CPU 211. Furthermore, the subtitle decoder 210 transmits the time stamp (PTS) on the first time axis with 90 kHz accuracy included in the header of the subtitle PES packet to the CPU 211. Regarding the time stamp (PTS), timings are uniformly managed in the whole system.

By using the time stamp and the reference time information (start time of sample period indicated by second time axis), the CPU 211 converts the display start time and the display end time of each region indicated by the information regarding the display timing (begin, end) into a time on the first time axis with 90 kHz accuracy (refer to formulas (2) and (3) above).

Note that the TTML segments and the reference time segments regarding the plurality of subtitle contents which has been individually produced may be included in the payload of the subtitle PES packet. That is, not only one but also two or more pairs (group) of the TTML segments and the reference time segments may be included in the payload of the subtitle PES packet.

However, as described above, in each pair, the TTML segment and the reference time segment are associated with each other with the identification information "segment_associate_id". In a case where the CPU 211 converts a display start time and a display end time of each region in a TTML document included in a TTML segment into a time with 90 kHz accuracy, the CPU 211 prevents wrong conversion by using the reference time information of the reference time segment associated with the TTML segment.

The video superimposition unit 204 superimposes the bit map data of each region obtained from the subtitle decoder 210 on the image data obtained by the video decoder 203. In this case, under the control of the CPU 211, the video superimposition unit 204 superimposes the bit map data of each region only in a period from the display start time to the display end time with 90 kHz accuracy converted as described above.

Furthermore, to increase the display probability of subtitles at the time of random access caused by channel switching, a case is considered where the subtitle PES packets including the same TTLM document are sequentially generated and transmitted in synchronization with the sample period (refer to FIG. 10). In that case, the display start time of each region indicated by the information regarding the display timing (begin) may be positioned before a reference time (start time of sample period) "Reftime" indicated by the reference time information.

When the display start time of each region indicated by the information regarding the display timing (begin) is positioned before the start time of the sample period indicated by the reference time information, the video superimposition unit 204 immediately superimposes the bit map data of each region obtained from the subtitle decoder 210 on the image data obtained by the video decoder 203 under the control of the CPU 211.

Figure 20:
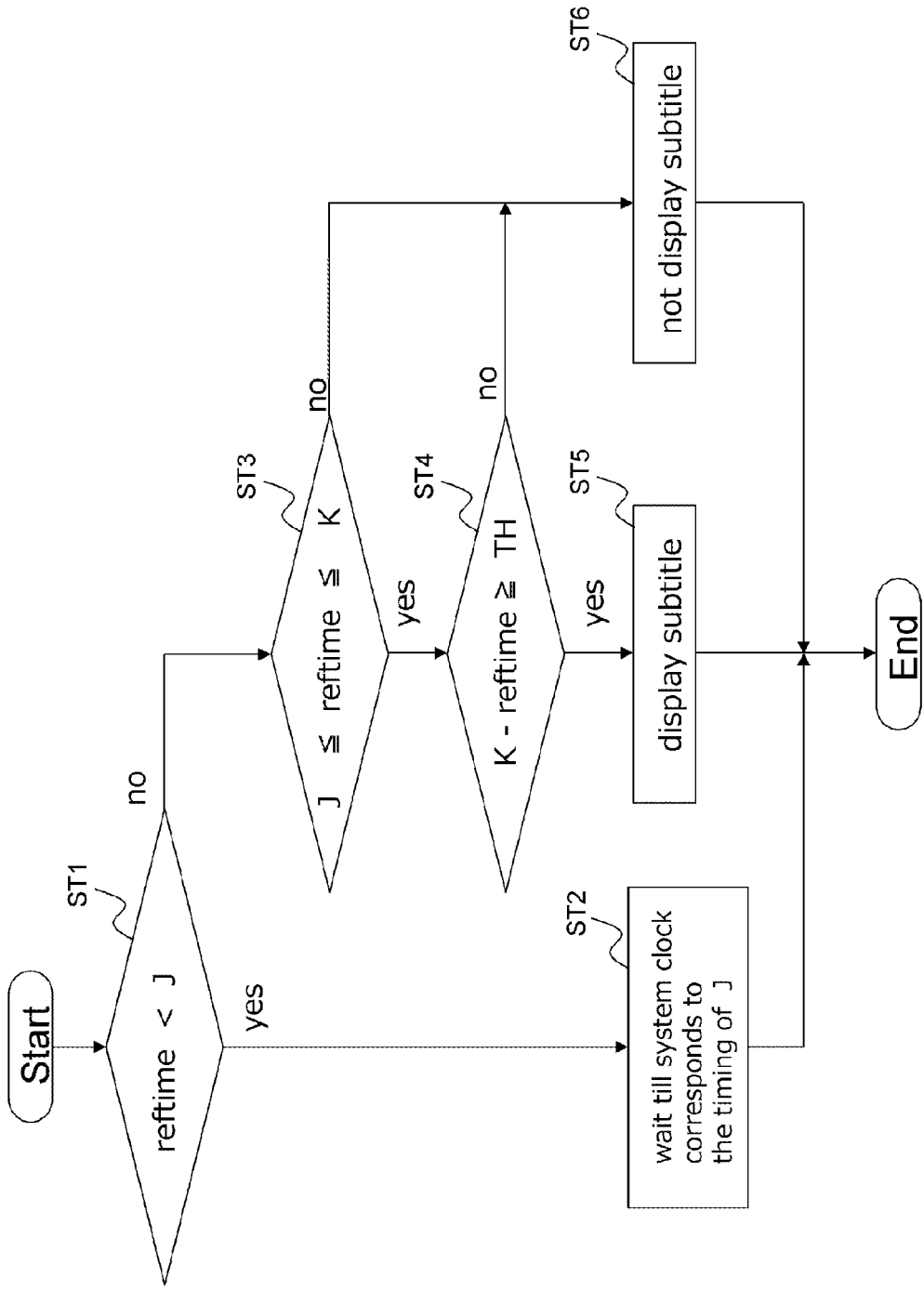
FIG. 20 is a diagram of an exemplary processing procedure of subtitle display control performed each time when a CPU receives the subtitle PES packet.

A flowchart in FIG. 20 illustrates an exemplary processing procedure of subtitle display control performed each time when the CPU 211 receives the subtitle PES packet. Note that, in this example, the references "J" and "K" respectively indicates the display start time and the display end time indicated by the information regarding the display timing (begin, end) (refer to FIG. 10).

In step ST1, the CPU 211 determines whether "Reftime" is smaller than "J". When "Reftime" is smaller than "J" (for example, "Reftime10" in FIG. 10), the CPU 211 waits till a system clock corresponds to a timing of "J" and performs control to superimpose the bit map data of each region on the image data and to start to display the subtitle at the timing of "J" in step ST2.

When "Reftime" is not smaller than "J" in step ST1, the CPU 211 determines in step ST3 whether "Reftime" is equal to or larger than "J" and equal to or smaller than "K". When "Reftime" is equal to or larger than "J" and equal to or smaller than "K" (for example, "Reftime 11" in FIG. 10), the procedure proceeds to step ST4.

In step ST4, the CPU 211 determines whether a time from "Reftime" to "K" is equal to or longer than a threshold TH, that is, whether there is a sufficient time from "Reftime" to "K". When there is a sufficient time and when the subtitle display has already started and there is enough time before the end of the display, the CPU 211, in step ST5, immediately performs control to superimpose the bit map data of each region on the image data and to start display of the subtitle.

Furthermore, when the "Reftime" is not equal to or larger than "J" and equal to or smaller than "K" in step ST3, and in addition, when the time from "Reftime" to "K" is not equal to or longer than the threshold TH in step ST4, the CPU 211 performs control in step ST6 so as not to superimpose the bit map data of each region on the image data, that is, not to display the subtitle.

Returning to FIG. 19, the panel drive circuit 205 drives the display panel 206 on the basis of image data for display obtained by the video superimposition unit 204. The display panel 206 includes, for example, a Liquid Crystal Display (LCD), an organic electroluminescence (EL) display, and the like.

An operation of the television receiver 200 illustrated in FIG. 19 will be briefly described. The reception unit 201 receives the transport stream TS transmitted from the broadcasting transmission system 100 on a broadcast wave. The transport stream TS includes a video stream, an audio stream, and a subtitle stream.

The transport stream TS is supplied to the TS analysis unit 202. The TS analysis unit 202 extracts the video stream, the audio stream, and the subtitle stream from the transport stream TS. The video stream (PES stream) extracted by the TS analysis unit 202 is supplied to the video decoder 203. The video decoder 203 decodes a video PES packet included in the video stream to obtain image data. The image data is supplied to the video superimposition unit 204.

Furthermore, the subtitle stream (PES stream) extracted by the TS analysis unit 202 is supplied to the subtitle decoder 210. The subtitle decoder 210 decodes a subtitle PES packet included in the subtitle stream to obtain bit map data of each region (subtitle graphics data) to be superimposed on the image data.

In this case, the TTML document is extracted from the TTML segment included in the payload of the subtitle PES packet, and bit map data of each region is obtained on the basis of the TTML document.

Furthermore, the subtitle decoder 210 extracts information regarding the display timing (begin, end) of each region from the body of the TTML document (refer to FIG. 5) and transmits the information to the CPU 221. Furthermore, the subtitle decoder 210 extracts the reference time information of the second time axis regarding the display timing of each region from the reference time segment and transmits the extracted information to the CPU 211. Furthermore, the subtitle decoder 210 extracts the time stamp (PTS) on the first time axis with 90 kHz accuracy included in the header of the subtitle PES packet and transmits the time stamp to the CPU 211.

By using the time stamp and the reference time information (start time of sample period indicated by second time axis), the CPU 211 converts the display start time and the display end time of each region indicated by the information regarding the display timing (begin, end) into a time on the first time axis with 90 kHz accuracy, (refer to formulas (2) and (3) above).

The bit map data of each region output from the subtitle decoder 210 is supplied to the video superimposition unit 204. The video superimposition unit 204 superimposes the bit map data of each region obtained from the subtitle decoder 210 on the image data obtained by the video decoder 203. In this case, under the control of the CPU 211, the video superimposition unit 204 superimposes the bit map data of each region only in a period from the display start time to the display end time with 90 kHz accuracy converted as described above.

Note that, in this case, when the display start time of each region indicated by the information regarding the display timing (begin) is positioned before the start time of the sample period, the video superimposition unit 204 immediately superimposes the bit map data of each region obtained from the subtitle decoder 210 on the image data obtained by the video decoder 203 under the control of the CPU 211.

The image data for display obtained by the video superimposition unit 204 is supplied to the panel drive circuit 205. The panel drive circuit 205 drives the display panel 206 on the basis of video data for display. With this drive, an image on which the regions are superimposed is displayed on the display panel 206.

As described above, in the transmission/reception system 10 illustrated in FIG. 1, the broadcasting transmission system 100 generates and transmits the subtitle PES packet in synchronization with the sample period, the header of the subtitle PES packet includes the time stamp (PTS) on the first time axis indicating the start time of the corresponding sample period, and the payload of the subtitle PES packet includes the reference time information of the second time axis regarding the display timing of each region, associated with the start time of the corresponding sample period. Therefore, it is possible to secure an association with the system timing at the time of transmission without changing the display timing in the text information of the subtitle, and the reception side can display the subtitle at an appropriate timing.

Furthermore, in the transmission/reception system 10 illustrated in FIG. 1, the broadcasting transmission system 100 associates the TTML segment and the reference time segment with each other with the identification information in each pair of the TTML segment and the reference time segment included in the payload of the subtitle PES packet. Therefore, in a case where the reception side converts a display start time and a display end time of each region in a TTML document included in a certain TTML segment into a time with 90 kHz accuracy, wrong conversion can be prevented by using the reference time information of the reference time segment associated with the TTML segment.

Furthermore, in the transmission/reception system 10 illustrated in FIG. 1, the television receiver 200 controls the display timing of the subtitle according to the text information of the subtitle on the basis of the time stamp (PTS) included in the header of the subtitle PES packet and the reference time information included in the payload. Therefore, it is possible to display the subtitle at an appropriate timing.

2. Modification

Note that, in the above embodiment, the reference time information included in the payload of the subtitle PES packet is assumed as time information indicating the start time "Reftime" of the corresponding sample period. However, it can also be considered to use time information indicating the difference "Δ" (refer to FIG. 7) between the display start time indicated by the display timing information and the start time of the sample period or a start time of a sample period corresponding to the display end time indicated by the display timing information.

Furthermore, in the above embodiment, an example has been described in which the TTML is used as the text information of the subtitle in a predetermined format having the display timing information. However, the present technology is not limited to this, and it is considered to use other timed text information having information equivalent to the TTML. For example, a format derived from the TTML may be used.

Furthermore, in the above embodiment, the transmission/reception system 10 including the broadcasting transmission system 100 and the television receiver 200 has been described. However, a configuration of a transmission/reception system to which the present technology can be applied is not limited to this. For example, a configuration may be used in which a portion of the television receiver 200 is replaced with a set top box and a monitor connected with a digital interface such as a High-Definition Multimedia Interface (HDMI). Note that the "HDMI" is a registered trademark.

Furthermore, in the above embodiment, an example has been described in which the container (multiplexed stream) is a MPEG-2 transport stream. Naturally, the present technology can be similarly applied to a case where the multiplexed stream is a MMT stream, a DASH/ISOBMFF stream, or the like.

Furthermore, the present technology can have a configuration below.

(1) A transmitter including:

a packet transmission unit configured to generate and transmit a packet in which a document of text information of a subtitle having display timing information is included in a payload in synchronization with a sample period, in which a time stamp on a first time axis indicating a start time of the corresponding sample period is included in a header of the packet, and the payload of the packet further includes reference time information of a second time axis regarding the display timing, associated with the start time of the corresponding sample period.

(2) The transmitter according to (1), in which the reference time information is time information indicating the start time of the corresponding sample period.

(3) The transmitter according to (1), in which the reference time information is time information indicating a difference between a display start time indicated by the display timing information and the start time of the corresponding sample period or a difference between a display end time indicated by the display timing information and the start time of the corresponding sample period.

(4) The transmitter according to any one of (1) to (3), in which a time is indicated by a count value of 90 kHz on the first time axis, and a time is indicated by an hour-minute-second frame on the second time axis.

(5) The transmitter according to any one of (1) to (4), in which the packet is a PES packet.

(6) The transmitter according to any one of (1) to (5), in which the payload of the packet includes a first segment having the document of the text information of the subtitle and a second segment having the reference time information regarding the display timing.

(7) The transmitter according to (6), in which the first segment is associated with the second segment corresponding to the first segment with identification information.

(8) The transmitter according to any one of (1) to (7), in which the packet transmission unit generates and transmits the packet in the sample period after the display start time indicated by the display timing information has passed.

(9) A transmission method including:

generating and transmitting a packet in which a document of text information of a subtitle having display timing information is included in a payload in synchronization with a sample period by a transmission unit, in which a time stamp on a first time axis indicating a start time of the corresponding sample period is included in a header of the packet, and the payload of the packet further includes reference time information of a second time axis regarding the display timing, associated with the start time of the corresponding sample period.

(10) A receiver including:

a reception unit configured to receive a packet in which a document of text information of a subtitle having display timing information is included in a payload in synchronization with a sample period, in which a time stamp on a first time axis indicating a start time of the corresponding sample period is included in a header of the packet, and the payload of the packet further includes reference time information of a second time axis regarding the display timing, associated with the start time of the corresponding sample period, the receiver further including:

a control unit configured to control a display timing of the subtitle according to the text information of the subtitle on the basis of the time stamp and the reference time information.

(11) The receiver according to (10), in which the control unit converts a display start time and a display end time indicated by the display timing information into a time on the first time axis by using the time stamp and the reference time information and controls the display timing of the subtitle by using the converted time.

(12) The receiver according to (10) or (11), in which the control unit performs control to immediately display the subtitle according to the text information of the subtitle when the display start time indicated by the display timing information is positioned before the start time of the sample period.

(13) The receiver according to any one of (10) to (12), in which the payload of the packet includes a first segment having the document of the text information of the subtitle and a second segment having the reference time information regarding the display timing, the first segment is associated with the second segment corresponding to the first segment with identification information, and the control unit controls the display timing of the subtitle according to the text information of the subtitle included in the first segment by using the reference time information included in the second segment associated with the first segment.

(14) A reception method including:

receiving a packet in which a document of text information of a subtitle having display timing information is included in a payload in synchronization with a sample period by a reception unit, in which a time stamp on a first time axis indicating a start time of the corresponding sample period is included in a header of the packet, the payload of the packet further includes reference time information of a second time axis regarding the display timing, associated with the start time of the corresponding sample period, and the reception unit controls a display timing of the subtitle according to the text information of the subtitle on the basis of the time stamp and the reference time information.

The main feature of the present technology is that an association with a system timing at the time of transmission is secured without changing the display timing in the text information of the subtitle and that the reception side can display the subtitle at an appropriate timing by generating and transmitting the subtitle PES packet in synchronization with the sample period, including the time stamp (PTS) on the first time axis indicating the start time of the corresponding sample period in the header, and including the reference time information of the second time axis regarding the display timing of each region, associated with the start time of the corresponding sample period in the payload (refer to FIGS. 7 and 8).

REFERENCE SIGNS LIST

10 Transmission/reception system
100 Broadcast transmission system
110 Stream generation unit
111 Control unit
112 video encoder
113 Audio encoder
114 Text format conversion unit
115 Subtitle encoder
116 TS formatter
200 Television receiver
201 Reception unit
202 TS analysis unit
203 Video decoder
204 Video superimposition unit
205 Panel drive circuit
206 Display panel
207 Audio decoder
208 Audio output circuit
209 Speaker
210 Subtitle decoder
221 CPU
222 Flash ROM
223 DRAM
224 Internal bus
225 Remote control reception unit
226 Remote control transmitter

The invention claimed is:

1. A transmitter comprising:

processing circuitry configured to generate and transmit a packet in which text information of a subtitle having display timing information is included in a payload of the packet in synchronization with a corresponding sample period, wherein time information regarding a first time axis is included in a header of the packet, and the payload of the packet further includes reference time information corresponding to a start time of the corresponding sample period, the start time being indicated in the time information, the reference time information being on a second time axis that uses a reference point different than a reference point of the time information on the first time axis, the reference time information being different from the display timing information of the subtitle.

2. The transmitter according to claim 1, wherein the reference time information is time information indicating a difference between a display start time indicated by the display timing information and the start time of the corresponding sample period or a difference between a display end time indicated by the display timing information and the start time of the corresponding sample period.

3. The transmitter according to claim 1, wherein a time on the first time axis is indicated by a count value of 90 kHz, and a time on the second time axis is indicated by an hour-minute-second frame.

4. The transmitter according to claim 1, wherein the packet is a packetized elementary stream (PES) packet.

5. The transmitter according to claim 1, wherein the payload of the packet includes a first segment having the text information of the subtitle and a second segment having the reference time information.

6. The transmitter according to claim 5, wherein the first segment is associated with the second segment.

7. The transmitter according to claim 1, wherein the processing circuitry is configured to generate and transmit the packet in the corresponding sample period after a display start time indicated by the display timing information has passed.

8. The transmitter according to claim 1, wherein
the time information regarding the first time axis is a Presentation Time Stamp (PTS) indicating the start time of the corresponding sample period on a system time axis as the first time axis, and
the display timing information of the text information of the subtitle is on the second time axis and is expressed with respect to the reference point of the reference time information.

9. A transmission method comprising:
generating and transmitting a packet in which text information of a subtitle having display timing information is included in a payload of the packet in synchronization with a corresponding sample period by a transmission unit, wherein
time information regarding a first time axis is included in a header of the packet, and
the payload of the packet further includes reference time information corresponding to a start time of the corresponding sample period, the start time being indicated in the time information, the reference time information being on a second time axis that uses a reference point different than the reference point of the time information on the first time axis, the reference time information being different from the display timing information of the subtitle.

10. A receiver comprising:
processing circuitry configured to receive a packet in which text information of a subtitle having display timing information is included in a payload of the packet in synchronization with a corresponding sample period, wherein time information regarding a first time axis is included in a header of the packet, the payload of the packet includes reference time information corresponding to a start time of the corresponding sample period, the start time being indicated in the time information, the reference time information being on a second time axis that uses a reference point different than a reference point of the time information on the first time axis, the reference time information being different from the display timing information of the subtitle, and the processing circuitry is further configured to control a display timing of the subtitle according to the text information of the subtitle on a basis of the time information and the reference time information.

11. The receiver according to claim 10, wherein the processing circuitry is configured to convert a display start time and a display end time indicated by the display timing information into a time on the first time axis by using the time information and the reference time information and is configured to control the display timing of the subtitle by using the converted display start time and the converted display end time on the first time axis.

12. The receiver according to claim 10, wherein the processing circuitry is configured to perform control to immediately display the subtitle according to the text information of the subtitle when a display start time indicated by the display timing information is positioned before the start time of the corresponding sample period.

13. The receiver according to claim 10, wherein
the payload of the packet includes a first segment having the text information of the subtitle and a second segment having the reference time information,
the first segment is associated with the second segment, and
the processing circuitry is configured to control the display timing of the subtitle according to the text information of the subtitle included in the first segment by using the reference time information included in the second segment associated with the first segment.

14. The receiver according to claim 10, wherein
the time information regarding the first time axis is a Presentation Time Stamp (PTS) indicating the start time of the corresponding sample period on a system time axis as the first time axis, and
the display timing information of the text information of the subtitle is on the second time axis and is expressed with respect to the reference point of the reference time information.

15. The receiver according to claim 10, wherein the receiver includes a monitor.

16. The receiver according to claim 15, wherein the receiver is configured to display video data and the subtitle on the monitor.

17. A reception method comprising:
receiving, by processing circuitry of a receiver apparatus, a packet in which text information of a subtitle having display timing information is included in a payload of the packet in synchronization with a corresponding sample period, wherein
time information regarding a first time axis is included in a header of the packet,
the payload of the packet includes reference time information corresponding to a start time of the corresponding sample period, the start time being indicated in the time information, the reference time information being on a second time axis that uses a reference point different than a reference point of the time information on the first time axis, the reference time information being different from the display timing information of the subtitle, and the method further includes controlling, by the processing circuitry of the receiver apparatus, a display timing of the subtitle according to the text information of the subtitle on a basis of the time information and the reference time information.

18. The reception method according to claim 17, wherein the time information regarding the first time axis is a Presentation Time Stamp (PTS) indicating the start time of the corresponding sample period on a system time axis as the first time axis, and the display timing information of the text information of the subtitle is on the second time axis and is expressed with respect to the reference point that is the same as the reference point of the reference time information.

\* \* \* \* \*